Feb. 19, 1935.                K. K. PALUEFF                1,992,013
                         TRANSFORMER FAULT DETECTOR
                            Filed Nov. 1, 1933
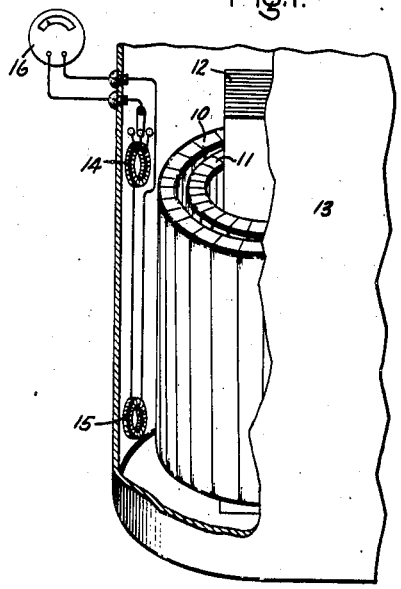
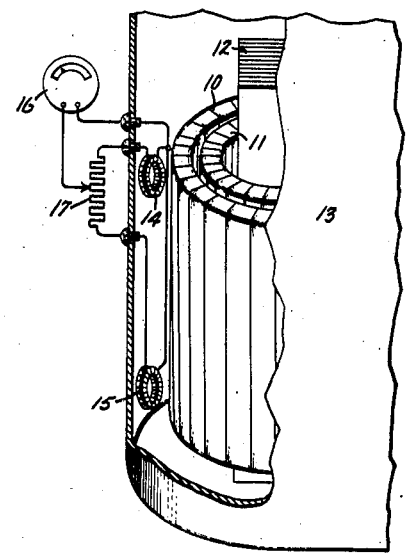
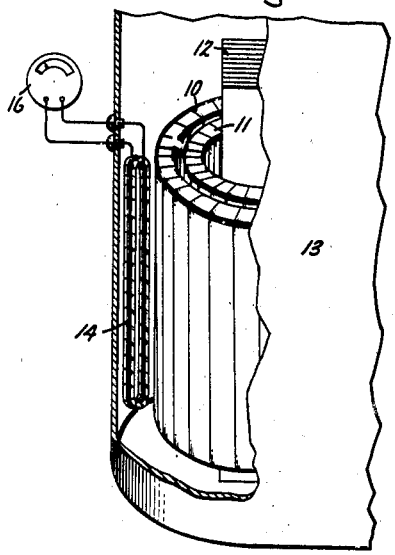
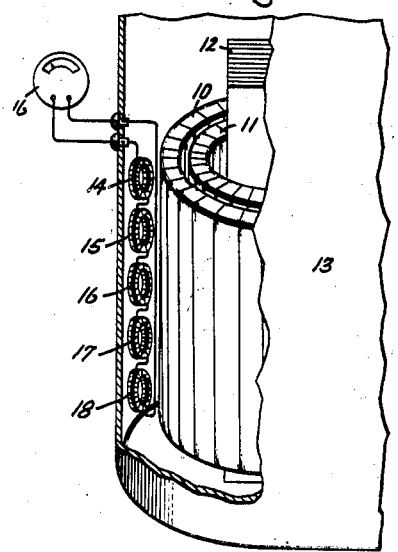
Inventor:
Konstantin K. Palueff,
by Harry E. Dunham
His Attorney.

Patented Feb. 19, 1935

1,992,013

UNITED STATES PATENT OFFICE 1,992,013

TRANSFORMER FAULT DETECTOR

Konstantin K. Palueff, Pittsfield, Mass., assignor to General Electric Company, a corporation of New York Application November 1, 1933, Serial No. 696,213

3 Claims. (Cl. 177—311)

My invention relates to transformer fault detectors. There may be a failure or breakdown of some part of the insulation of a transformer. The failure may be due to abnormally high voltage conditions or to a defect in the insulation. There may be a sudden development of a serious fault but it often happens that a fault first starts as a very slight defect which does not interfere at all with the normal operation of the transformer and which remains undetected for a considerable period of time. Such a slight defect may become more serious, however, and finally result in a serious breakdown of the insulation. The general object of the invention is to provide an improved arrangement for detecting and indicating the presence of a slight defect in the insulation of a transformer so that the defect may be repaired before serious injury occurs to the transformer.

The invention will be more fully explained in the following description taken in connection with the accompanying drawing in which Fig. 1 is a view of a transformer having a metal casing and provided with one form of fault detector arranged in accordance with the invention, part of the casing being broken away to show details, and Figs. 2, 3 and 4 are similar views of transformers provided with other forms of fault detectors arranged in accordance with the invention.

Like reference characters indicate similar parts in the different figures of the drawing.

The transformer shown in Fig. 1 includes windings 10 and 11 on a magnetic core 12. The transformer is enclosed in a casing 13 formed as usual of sheet steel. The main magnetic flux flows in the magnetic core 12 but some leakage flux from the windings finds a return path through the wall of the magnetic casing 13.

In the arrangement of the invention shown in Fig. 1, two windings 14 and 15 are supported between the windings and the wall of the casing 13 and are connected in series with an instrument 16. The windings 14 and 15 are located respectively adjacent opposite ends of the transformer windings 10 and 11 where the leakage flux flows in opposite directions between the transformer windings and the casing 13. The windings 14 and 15 are so located and proportioned that their voltages are equal and opposed under normal conditions of operation of the transformer and the instrument 16 will be unaffected. The instrument 16 may be of any suitable type, such as an ordinary voltmeter, which will respond to and indicate an unbalanced voltage in the windings 14 and 15. It may be difficult to calculate the leakage flux accurately and one of the windings 14 and 15 may be provided with tap connections and a tap switch to permit their voltages to be equalized if necessary. The voltages may also be equalized by changing the position of one or both windings.

With the arrangement which has been described, the voltages of the two windings 14 and 15 are equal and opposed under normal operating conditions of the transformer. If, however, a fault occurs in the windings 10 and 11 so that some of the turns are partially or completely short circuited, the short circuit current in these turns will cause some of the leakage flux to change its path. Except in the improbable event that the fault is so located that the change in leakage flux is symmetrical with respect to both windings 14 and 15, the voltages induced in these windings by the changed leakage flux will be unbalanced and the instrument 16 will respond to the unbalanced voltage and indicate the fault.

In the arrangement shown in Fig. 2, the two windings 14 and 15 are connected in a closed series circuit with a resistance 17. The instrument 16 is connected between an intermediate point of the resistance 17 and the other side of the circuit between the two windings. The voltages of the two windings 14 and 15 are additive rather than opposed as in the similar windings of Fig. 1 so that a circulating current flows through the windings and resistance. The instrument 16 is connected, preferably by an adjustable contact, to that point of the resistance 17 where the voltage is equal to that of the other side of the circuit so that under normal conditions there will be no voltage impressed on the instrument. A fault in the windings will divert or change the path of some of the leakage flux and thus the relative voltages of the windings 14 and 15 and the instrument 16 will respond to indicate the fault.

In the arrangement shown in Fig. 3, a single winding 14, preferably at least as long as the windings 10 and 11, is supported in the space between the wall of the casing 13 and the windings 10 and 11. The winding 14 is so located with respect to the windings 10 and 11 that under normal conditions the leakage flux flowing through the winding 14 in one direction between the casing wall and the windings 10 and 11 is equal to that flowing in the other direction. Thus, the tendency of the flux flowing in one direction to induce voltage in the winding 14 is neutralized by the flux flowing in the other direction. The winding 14 is connected to an instrument 16 which is unaffected under normal conditions. A fault in the windings 10 and 11 changes the distribution of the leakage flux through the winding 14 so that it does not flow equally in both directions and the unbalanced flux induces a voltage causing the instrument 16 to respond and indicate the fault.

The arrangement shown in Fig. 4 is similar to that of Fig. 1 except that a plurality of series connected windings 14 to 18 inclusive are distributed along the windings 10 and 11 and connected to the instrument 16. These windings 14 to 18 are so disposed that under normal conditions the voltage induced in them by the leakage flux flowing through them in one direction is equal and opposed to that induced by the leakage flux flowing through them in the opposite direction. The instrument 16 is therefore not affected. A fault in the windings 10 and 11, however, changes the distribution of the leakage flux so that the opposed voltages in the windings 14 to 18 are no longer equal and the instrument 16 will respond to indicate the fault.

The invention has been explained by describing and illustrating several arrangements thereof but it will be apparent that other forms and arrangements may be used without departing from the spirit of the invention and the scope of the appended claims.

What I claim as new and desire to secure by Letters Patent of the United States is:

1. The combination with a transformer having a magnetic core with windings enclosed in a magnetic casing, of at least one fault detecting winding disposed in the paths of leakage flux flowing normally in both directions between said transformer windings and casing, and an instrument connected to normally equipotential points of the fault detecting winding or windings to indicate the occurrence of a fault in said transformer windings.

2. The combination with a transformer having a magnetic core with windings enclosed in a magnetic casing, of at least one fault detecting winding disposed between said transformer windings and casing, portions of said fault detecting winding or windings being disposed respectively in the paths of leakage flux flowing normally in opposite directions between the transformer windings and casing, and an instrument connected to normally equipotential points of the fault detecting winding or windings to indicate the occurrence of a fault in said transformer windings.

3. The combination with a transformer having a magnetic core with windings enclosed in a magnetic casing, of a plurality of fault detector windings distributed between said transformer windings and casing, part of said fault detector windings being disposed in the path of leakage flux flowing normally in one direction between the transformer windings and casing, and another part of said fault detector windings being disposed in the path of leakage flux flowing normally in the other direction between the transformer windings and casing, and an instrument connected to normally equipotential points of the fault detector windings to indicate the occurrence of a fault in said transformer windings.

KONSTANTIN K. PALUEFF.